United States Patent
Watanabe et al.

(10) Patent No.: US 8,546,989 B2
(45) Date of Patent: Oct. 1, 2013

(54) MOTOR AND ELECTRICAL APPLIANCE PROVIDED WITH SAME

(75) Inventors: Akihiko Watanabe, Osaka (JP); Yoshinori Isomura, Osaka (JP); Tatsuo Maetani, Hyogo (JP); Hiroki Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/808,529

(22) PCT Filed: Feb. 28, 2012

(86) PCT No.: PCT/JP2012/001338
§ 371 (c)(1),
(2), (4) Date: Jan. 4, 2013

(87) PCT Pub. No.: WO2012/120828
PCT Pub. Date: Sep. 13, 2012

(65) Prior Publication Data
US 2013/0119806 A1    May 16, 2013

(30) Foreign Application Priority Data
Mar. 7, 2011   (JP) .................. 2011-048703

(51) Int. Cl.
*H02K 21/12* (2006.01)
(52) U.S. Cl.
USPC ........................... 310/156.01; 310/43
(58) Field of Classification Search
USPC ................ 310/43, 156.01–156.77
See application file for complete search history.

(56) References Cited

U.S. PATENT DOCUMENTS

| | | | |
|---|---|---|---|
| 3,909,647 A * | 9/1975 | Peterson ................. | 310/156.12 |
| 6,404,086 B1 * | 6/2002 | Fukasaku et al. ............. | 310/89 |
| 6,707,208 B2 * | 3/2004 | Durham et al. ......... | 310/156.37 |
| 6,960,856 B2 * | 11/2005 | Reimann ................. | 310/156.28 |
| 2003/0020351 A1 * | 1/2003 | Lee et al. ................ | 310/156.53 |
| 2003/0230946 A1 * | 12/2003 | Durham et al. ......... | 310/156.07 |
| 2005/0062352 A1 * | 3/2005 | Kastinger ............... | 310/156.02 |
| 2005/0127760 A1 * | 6/2005 | Tanaka ....................... | 310/49 R |
| 2006/0033402 A1 * | 2/2006 | Kim et al. .................... | 310/261 |
| 2006/0255678 A1 * | 11/2006 | Du et al. .................. | 310/156.43 |
| 2007/0228864 A1 * | 10/2007 | Graham et al. ............... | 310/195 |

FOREIGN PATENT DOCUMENTS

| | | |
|---|---|---|
| JP | 2007-159302 A | 6/2007 |
| JP | 2007-198628 A | 8/2007 |
| JP | 2010-158152 A | 7/2010 |
| JP | 2010-207073 A | 9/2010 |

OTHER PUBLICATIONS

International Search Report for International Application No. PCT/JP2012/001338, dated May 22, 2012, 1 page.

* cited by examiner

*Primary Examiner* — Thanh Lam
(74) *Attorney, Agent, or Firm* — Brinks Hofer Gilson & Lione (57) ABSTRACT

An electric motor includes a stator that has a stator winding wound on a stator iron core; a rotor having a rotating body with a rotating shaft in the center; a bearing for journaling the rotating shaft; and two conductive brackets for fixing the bearing. The rotating body holds a magnet such that the magnet faces the stator, and is fastened to the rotating shaft penetrating through the center of the rotating body. In the rotating body, a dielectric layer is formed between the rotating shaft and the outer circumference of the rotating body. The dielectric layer has a polygonal shape with the rotating shaft in the center. An electric device includes the thus configured electric motor.

18 Claims, 4 Drawing Sheets

MOTOR AND ELECTRICAL APPLIANCE PROVIDED WITH SAME

This application is a 371 application of PCT/JP2012/001338 having an international filing date of Feb. 28, 2012, which claims priority to JP2011-048703 filed Mar. 7, 2011, the entire contents of which are incorporated herein by reference.

TECHNICAL FIELD

The present invention relates to an electric motor and an electric device including the electric motor, and particularly to an electric motor and an electric device including the electric motor improved to suppress occurrence of electrolytic corrosion in the bearing of the electric motor.

BACKGROUND ART

An air conditioner for air conditioning, such as cooling and heating, as one of electric devices, generally includes a fan for blowing air and an electric motor for rotary-driving the fan. In recent years, so-called brushless motors have been used as electric motors in many cases. In such a brushless motor, an inverter of a pulse width modulation system (hereinafter, referred to as a PWM system as appropriate) is used. On the other hand, the PWM system performs switching using high-frequency pulses, and thus unnecessary high-frequency signals are likely to radiate from the brushless motor.

In order to address this problem, an air conditioner for reducing high-frequency noise radiated from such an electric motor is conventionally proposed (see Patent Literature 1, for example). The technique used in such an air conditioner is to cover the part likely to be affected by radiated noise with a shield case, and to connect the shield case with the earth cable inside the air conditioner.

When an electric motor is driven by such an inverter of the PWM system, the neutral point potential of the winding is not zero, which causes a potential difference between the outer ring and the inner ring of a bearing (hereinafter, referred to as a shaft voltage). The shaft voltage includes a high-frequency component caused by switching. When the shaft voltage reaches the dielectric breakdown voltage of the oil film inside the bearing, micro-current flows inside the bearing and causes electrolytic corrosion inside the bearing. When the electrolytic corrosion proceeds, a wavy abrasion phenomenon can occur on the bearing inner ring, the bearing outer ring, or bearing balls, which leads to abnormal sound. This is one of the major factors of failures in the electric motor.

In this manner, electric motors using the PWM system are likely to generate unnecessary high-frequency signals that cause noise, and such unnecessary electromagnetic radiation causes electrolytic corrosion in the bearing.

The conventional measures considered to suppress electrolytic corrosion are as follows:

(1) Providing electrical continuity between the bearing inner ring and the bearing outer ring;

(2) Providing electrical insulation between the bearing inner ring and the bearing outer ring; and (3) Reducing the shaft voltage.

Examples of the specific methods for (1) include using a conductive lubricant in the bearing. However, the conductive lubricant has conductivity deteriorated with a lapse of time, and lacks sliding reliability. An alternative method considered is to dispose brushes on the rotating shaft so as to provide electrical continuity. However, this method produces brush abrasion powder and requires space.

Examples of the specific methods for (2) include replacing the iron balls in the bearing with non-conductive ceramic balls. This method is highly effective in suppressing electrolytic corrosion, but requires high cost. Thus, this method cannot be used for general-purpose electric motors.

As a specific method for (3), the following method is conventionally known. The stator iron core and conductive metal bracket are electrically short-circuited so as to change the capacitance and reduce the shaft voltage (see Patent Literature 2, for example).

In Patent Literature 2, short-circuiting the stator iron core and the bracket reduces the impedance of the stator side and thereby suppresses electrolytic corrosion in the bearing.

That is, generally, in the electric motor that is used in a washing machine, a dish washer/dryer, or the like, installed in a wet place and thus can cause electric shock, independent insulation (hereinafter, referred to as additional insulation) needs to be added to the insulation in the live part (basic insulation). In contrast, the electric motor used in an air conditioner has no danger of electric shock and thus requires no additional insulation.

Thus, in the electric motor used in an air conditioner, generally, the rotor does not have an insulated structure and the impedance of the rotor side (bearing inner-ring side) is in a low state. In contrast, the stator side (bearing outer-ring side) has an insulated structure and thus the impedance is in a high state. In this case, impedances cause a difference in voltage drop. The electric potential of the bearing inner-ring side is high while the electric potential of the bearing outer-ring side is low. This unbalanced state can produce a high shaft voltage. Such a high shaft voltage can cause electrolytic corrosion in the bearing.

In order to avoid such a state, in Patent Literature 2, the following method is used. The stator iron core and the bracket are short-circuited so as to eliminate the capacitance component between them. Then, as described above, the impedance of the stator side (bearing outer-ring side) is lowered and approximated to the impedance of the rotor side (bearing inner-ring side).

Particularly in the structure of a general brushless motor, the following phenomena and reasons for them are considered. For the impedance of the stator side between the stator iron core and the bearing outer ring, generally, the stator iron core and the bearing outer ring are not electrically connected and are disposed with a certain space, and thus the impedance between them is in a high state. Further, since the impedance between them is high, the high-frequency signal generated from the stator iron core attenuates and reaches the bearing outer ring. As a result, a high-frequency voltage at a low electric potential occurs in the bearing outer ring.

In contrast, for the impedance of the rotor side between the stator iron core and the bearing inner ring, the stator iron core faces the rotor with a small clearance provided between them, and generally the rotor and the rotating shaft are made of conductive metals, and thus the impedance between them is in a low state. Further, since the impedance between them is low, the high-frequency signal generated from the stator iron core reaches the bearing inner ring without attenuation. As a result, a high-frequency voltage at a high electric potential occurs in the bearing inner ring.

As described above, also the structure of the brushless motor itself is likely to unbalance the impedance of the rotor side and that of the stator side. This generates an electric potential difference, i.e. a shaft voltage, between the inner ring and the outer ring of the bearing, which causes electrolytic corrosion in the bearing. The major source of generating signals that cause such a shaft voltage is the stator iron core that has a winding to be driven by high-frequency switching based on the PWM system wound thereon. That is, since the winding to be driven by high-frequency current is wound on the stator iron core, in the stator iron core, high-frequency signals are generated by driving high-frequency waves as well as magnetic flux generated by the driving current. The generated high-frequency signals are led to the bearing inner ring and the bearing outer ring via space.

In recent years, a molded motor has been proposed. In this type of motor, fixed members, such as a stator iron core on the stator side, are molded with a molding material, for example, to increase reliability. Then, it is considered that the bearing is fixed by such an insulating molding material, instead of a metal bracket, so as to suppress the unnecessary high-frequency voltage generated on the bearing outer-ring side and the unnecessary high-frequency current flowing between the inner ring and the outer ring of the bearing. However, since such a molding material is made of resin, its strength is not sufficiently high to fix the bearing. Further, the resin molding provides low dimensional accuracy, which is likely to cause creep failures in the bearing. That is, generally in a bearing, when a gap is present between the outer ring and the inner circumferential face of the housing, for example, force in the radial direction is caused to the rotating shaft by the transfer load. When such force is generated, the relative difference in the radial direction is likely to cause a sliding phenomenon. Such a sliding phenomenon is called creep. Generally, such creep can be suppressed by securely fixing the outer ring to the housing, such as a bracket. Further, with recent increases in the output of an electric motor, more secure fixation of the bearing becomes necessary. Thus, it is essential to take creep-preventing measures, such as using a metal bracket preformed from a steel sheet with a high dimensional accuracy to fix the bearing. Especially, it is typical that bearings journal a rotating shaft at two points. It is preferable that two bearings are fixed by metal brackets for the reasons of the above-mentioned strength and easy implementation.

As a technique for suppressing electrolytic corrosion, the conventional method as disclosed in Patent Literature 2 has the following problem. That is, this conventional method is to suppress electrolytic corrosion by changing the impedance of the stator side and keeping the electric potential balance between the inner ring and the outer ring of the bearing. In such a method, if the impedance is unbalanced in a usage environment of the electric motor, the following case can be considered. That is, inversely, the shaft voltage is increased and electrolytic corrosion is more likely to occur.

Particularly in the case of an air conditioner as an indoor unit, a heat exchanger generally made of metal makes up a sizable proportion of the inside of the air conditioner. Further, a fan connected with a rotating shaft is disposed so as to face this heat exchanger. Thus, large capacitance is likely to be generated between the heat exchanger and the fan. Thus, in the case of such an air conditioner, the effect of this capacitance can unbalance the impedance in the electric motor with high possibility. That is, for example, high-frequency signals radiated from the stator iron core flow into the rotating shaft as high-frequency current via the heat exchanger and the fan. This can further increase the electric potential on the bearing inner-ring side.

When two bearings are fixed by metal brackets for the above reason of strength, the impedances of both brackets are different because one bracket and the other bracket have different shapes and are disposed in different positions. Thus, the electric potential induced in the one bracket is different from the electric potential induced in the other bracket. This causes different shaft voltages in the two bearings and can cause a failure such that one bearing has no electrolytic corrosion but the other bearing has electrolytic corrosion.
PTL1
Japanese Patent Unexamined Publication No. 2007-198628
PTL2
Japanese Patent Unexamined Publication No. 2007-159302

SUMMARY OF THE INVENTION

An electric motor of the present invention includes the following elements:
 a stator that has a stator winding wound on a stator iron core;
 a rotor including the following elements:
  a rotating body facing the stator and holding magnets; and
  a rotating shaft having the rotating body fastened thereto so as to penetrate through the center of the rotating body;
 a bearing for journaling the rotating shaft; and
 two conductive brackets for fixing the bearing.
A dielectric layer is formed between the rotating shaft and the outer circumference of the rotating body, and the dielectric layer has a polygonal shape with the rotating shaft at the center thereof.

The number of corners of the polygon of the dielectric layer is equal to the number of magnetized poles of the magnet held in the rotating body. Each vertex of the polygon of the dielectric layer is disposed with the rotating shaft at the center and is placed correspondingly to the center between poles magnetized in the magnet held in the rotating body.

With this configuration, the impedance of the rotor side can be adjusted and balanced with the impedance of the stator side. This can reduce the shaft voltage between the bearing inner ring and the bearing outer ring. In this manner, the potential differences between the inner rings and the outer rings of the bearings can be reduced in the two bearings fixed by the conductive brackets. This can suppress electrolytic corrosion in the bearings caused by high-frequency waves caused by PWM, for example, while the fixation strength of the bearings is ensured. The dielectric layer having a polygonal shape can prevent idle running caused by rotation of the inner iron core and the outer iron core of the rotor.

The number of corners of the polygon of the dielectric layer is equal to the number of magnetized poles of the magnet held in the rotating body. This can minimize the unbalance caused by rotation. Further, each vertex of the polygon of the dielectric layer is disposed correspondingly to the center between poles magnetized in the magnet held in the rotating body, with the rotating shaft at the center. With this configuration, the dielectric layer can be disposed without interrupting the flow of magnetic flux generated from the magnet.

Each vertex of the polygon of the dielectric layer is formed into an R shape. This can facilitate the workability of the rotor iron core.

In the electric motor of the present invention, the rotating body has a plurality of insertion holes on the outer peripheral side of the dielectric layer, and a magnet is inserted in each insertion hole.

The dielectric layer covers at least the magnet on both sides of the rotating body in the axial direction.

This configuration can prevent misalignment of the magnet.

In the electric motor of the present invention, the two brackets are electrically connected with each other.

This configuration makes both brackets at an equal electric potential and suppresses the flow of high-frequency current via the rotating shaft. Further, since both brackets are at the equal electric potential, the potential difference between the inner ring and the outer ring of one bearing is approximated or equal to the potential difference between the inner ring and the outer ring of the other bearing.

In the electric motor of the present invention, the stator iron core may be electrically connected with the ground part.

In the electric motor of the present invention, the two brackets electrically connected with each other may be further electrically connected with the ground part.

In the electric motor of the present invention, the stator winding wound on the stator iron core is driven by an inverter of a pulse width modulation system.

Further, an electric device of the present invention includes the above electric motor.

As described above, in the electric motor of the present invention, the shaft voltage generated in two bearings can be suppressed low. Thus, an electric motor with suppressed electrolytic corrosion and an electric device including the electric motor can be provided.

DETAILED DESCRIPTION OF THE PREFERRED EMBODIMENTS

Hereinafter, a description will be provided for examples for implementing the present invention, using exemplary embodiments with reference to the accompanying drawings.

First Exemplary Embodiment

Figure 1:
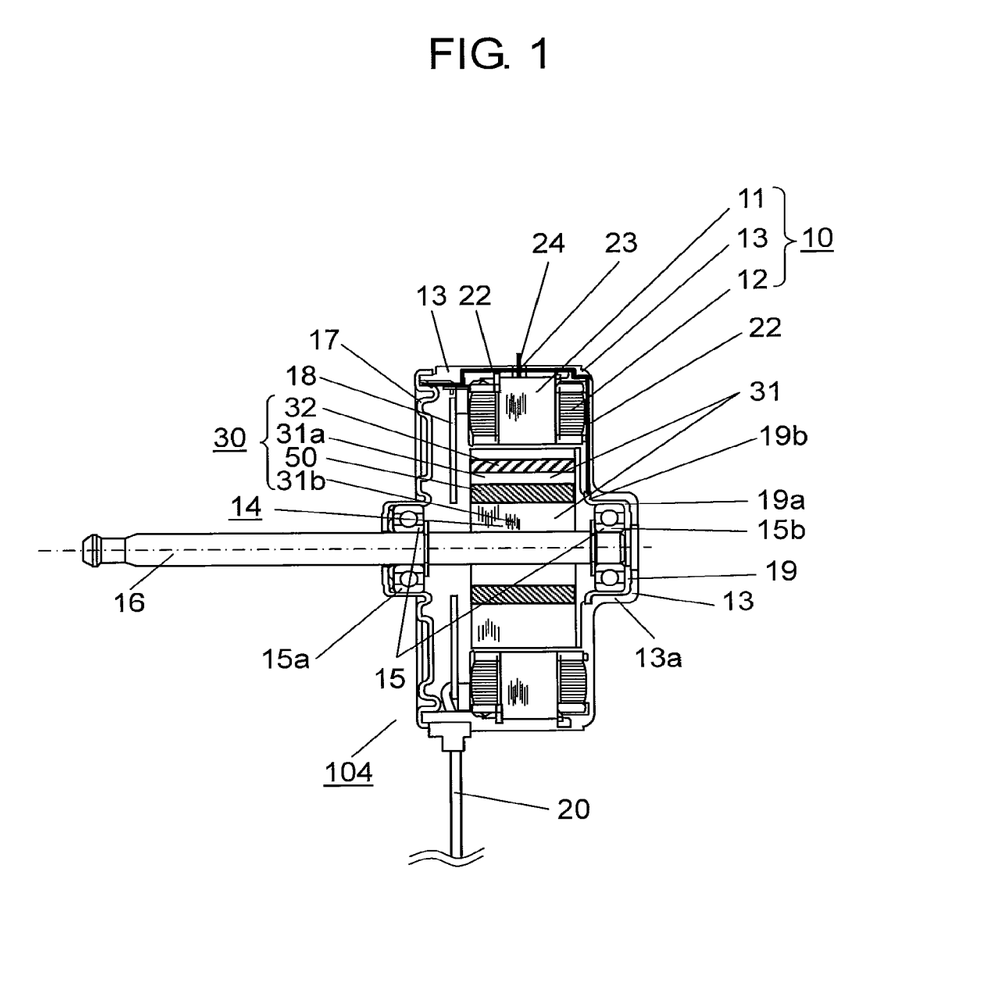
FIG. 1 is a structural diagram showing a section of an electric motor in accordance with a first exemplary embodiment of the present invention.

FIG. 1 is a structural diagram showing a section of electric motor 104 in accordance with the first exemplary embodiment of the present invention. In this exemplary embodiment, a description is provided for an example of a brushless motor using the PWM system, as electric motor 104. In this exemplary embodiment, as an example, a description is provided for an inner-rotor type brushless motor, where a rotor is disposed rotatably on the inner circumferential side of a stator.

With reference to FIG. 1, stator winding 12 is wound on stator iron core 11 with an insulator interposed between the stator iron core and the winding. Stator winding 12 is driven by an inverter of the pulse width modulation system. Such stator iron core 11 is molded with insulating resin 13, as a molding material, together with other fixing members. In this exemplary embodiment, these members are integrally molded in this manner so as to form stator 10 having a substantially cylindrical contour.

On the inner side of stator 10, rotor 14 is disposed with a clearance provided between them. Rotor 14 has disc-shaped or cylindrical-shaped rotating body 30 including metal rotor iron core 31, and has rotating shaft 16 having rotating body 30 fastened thereto so as to penetrate through the center of rotating body 30. Rotating body 30 faces the inner circumferential side of stator 10 and holds magnet 32. Rotating body 30 is structured such that outer iron core 31a forming the outer circumferential part of rotor iron core 31, dielectric layer 50, and inner iron core 31b forming the inner circumferential part of rotor iron core 31 are arranged in this order from the outermost circumferential part toward rotating shaft 16 on the inner circumferential side. FIG. 1 shows a configuration example where rotating body 30 has a plurality of insertion holes penetrating through rotor iron core 31 in the axial direction, magnets inserted in the respective insertion holes, and dielectric layer 50. However, a rotating body that holds a magnet on the outermost circumference of rotor iron core 31 can offer the similar advantage. In this manner, the inner circumferential side of stator 10 faces the outer circumferential side of rotating body 30.

Two bearings 15 for journaling rotating shaft 16 are attached to rotating shaft 16 of rotor 14. Each bearing 15 is a cylindrical-shaped bearing including a plurality of iron balls, and the inner-ring side of each bearing 15 is fixed to shaft 16. With reference to FIG. 1, on the output shaft side where rotating shaft 16 protrudes from the body of electric motor 104, bearing 15a journals rotating shaft 16. On the opposite side (hereinafter, referred to as the side opposite the output shaft side), bearing 15b journals rotating shaft 16. These bearings 15 are fixed by two conductive metal brackets, on the outer-ring sides of respective bearings 15. In FIG. 1, bearing 15a on the output shaft side is fixed by bracket 17, and bearing 15b opposite the output shaft side is fixed by bracket 19. With the above configuration, rotating shaft 16 is journaled by two bearings 15, so that rotor 14 is rotatable.

Further, electric motor 104 includes printed circuit board 18 on which a control circuit and a driver circuit are mounted. An inverter for driving stator winding 12, for example, is mounted on printed circuit board 18. Connection line 20 for the electric power supply of the driver circuit and control signals including a ground line is connected with printed circuit board 18.

In this exemplary embodiment, conductive pin 22 is electrically connected with bracket 19 in advance, and these elements are integrally molded. The tip of conductive pin 22 is exposed on the end face of stator 10 on the output shaft side, and is electrically connected with bracket 17. With this configuration that includes conductive pin 22, bracket 17 is electrically connected with bracket 19 inside electric motor 104.

Further, in this exemplary embodiment, through-hole 23 is formed in a part of insulating resin 13, i.e. a molding material, and one end of connection pin 24 connected with stator iron core 11 protrudes to the outside through through-hole 23.

When an electric power supply voltage and a control signal are supplied through connection line 20 to electric motor 104 thus configured, the driver circuit on printed circuit board 18 causes a driving current to flow through stator winding 12, and stator iron core 11 generates a magnetic field. The magnetic field from stator iron core 11 and the magnetic field from magnet 32 generate the attractive force and the repulsive force depending on the polarities of these magnetic fields. These forces rotate rotor 14 around rotating shaft 16 in the center.

Next, a description is provided for the detailed configuration in the structure of electric motor 104.

First, in electric motor 104, as described above, rotating shaft 16 is journaled by two bearings 15, and each bearing 15 is fixed and supported by a bracket. Further, in this exemplary embodiment, in order to suppress failures caused by creep as described above, each bearing 15 is fixed by a conductive metal bracket. That is, in this exemplary embodiment, the conductive brackets preformed from a steel sheet with a high dimensional accuracy are used to fix bearings 15. Especially when higher output of electric motor 104 is demanded, such a configuration is more preferable.

Specifically, bearing 15b opposite the output shaft side is fixed by bracket 19 having a diameter of the outer circumference substantially equal to the diameter of the outer circumference of bearing 15b. This bracket 19 is integrally molded with insulating resin 13. That is, as shown in FIG. 1, insulating resin 13 opposite the output shaft side is shaped so as to have body protruding part 13a protruding from the brushless motor body in the direction opposite the output shaft. On the inner side of body protruding part 13a, bracket 19 is disposed as an inner bracket and is integrally molded with insulating resin 13. Bracket 19 has a cup shape formed into a hollow cylinder. More specifically, the bracket has cylindrical portion 19a open on one side, and annular flange portion 19b slightly spreading in the outward direction from the cylindrical end on the open side. The diameter of the inner circumference of cylindrical portion 19a is substantially equal to the diameter of the outer circumference of bearing 15b. Bearing 15b is inserted into cylindrical portion 19a, and thereby bearing 15b is also fixed to insulating resin 13 via bracket 19. With this configuration, the outer-ring side of bearing 15b is fixed to metal bracket 19, so that failures caused by creep can be suppressed. The diameter of the outer circumference of flange portion 19b is slightly larger than the diameter of the outer circumference of bearing 15b. That is, the diameter of the outer circumference of flange portion 19b is larger than the diameter of the outer circumference of bearing 15b and at least smaller than the diameter of the outer circumference of rotating body 30. Forming bracket 19 into such a shape suppresses the use of the metal material of high cost in comparison with the structure, for example, where the flange portion extends beyond the outer circumference of rotating body 30 to stator iron core 11. In addition to the reduction of the area of metal bracket 19 in this manner, insulating resin 13 is integrally molded so as to cover the outer shell of bracket 19. Thus, the noise generated from bearing 15b can also be suppressed.

Next, bearing 15a on the output shaft side is fixed by bracket 17 having a diameter of the outer circumference substantially equal to the diameter of the outer circumference of stator 10. Bracket 17 has a substantially disc shape, and has a protruding part having a diameter substantially equal to the diameter of the outer circumference of bearing 15a, in the center of the disc shape. This protruding part has a hollow inside. After printed circuit board 18 is incorporated, bearing 15a is inserted so as to be disposed inside the protruding part of bracket 17. Further, bracket 17 is press-fitted to stator 10 such that the connection end formed on the outer circumference of bracket 17 fits to the connection end of stator 10. Thus, electric motor 104 is formed. With this configuration, the outer-ring side of bearing 15a is fixed to metal bracket 17. Thus, failures caused by creep can be suppressed.

Next, a description is provided for a configuration for suppressing electrolytic corrosion in this exemplary embodiment. In this exemplary embodiment, the electrolytic corrosion is suppressed substantially in the following manner. First, by forming dielectric layer 50 in rotating body 30 of electric motor 104, the impedance of the rotor side is increased and approximated to the impedance of the stator side being high impedance. This lowers the electric potential difference between the inner ring and the outer ring of each bearing, i.e. a shaft voltage. Further, in the case where electric motor 104 is used in the indoor unit of an air conditioner, the configuration that includes this dielectric layer 50 suppresses the transmission of high-frequency signals generated in stator iron core 11 to the fan or the heat exchanger, and reduces the shaft voltage caused by unnecessary radiation from the fan, for example.

Further, dielectric layer 50 having a polygonal shape can prevent idle running caused by rotation of inner iron core 31b and outer iron core 31a of the rotor. The number of corners of the polygon of dielectric layer 50 is equal to the number of magnetized poles of the magnet held in the rotating body. This configuration can minimize the unbalance caused by the rotation. In the electric motor shown in FIG. 1, the magnet is magnetized with eight poles, and thus dielectric layer 50 has an octagonal shape. Further, each vertex of the polygon of dielectric layer 50 is placed correspondingly to the center between poles magnetized in the magnet held in the rotating body, with the rotating shaft at the center. With this configuration, the dielectric layer can be disposed without interrupting the flow of magnetic flux generated from the magnet. Further, each vertex of the polygon of dielectric layer 50 is formed into an R (rounded) shape. This can facilitate the workability of the rotor iron core.

Further, stator iron core 11 is electrically connected with the ground part via connection pin 24. This attenuates the high-frequency signals generated in stator iron core 11 and also reduces the shaft voltage. The configuration where bracket 17 is electrically connected with bracket 19 makes both brackets at an equal electric potential and suppresses a failure such that the shaft voltage of one bracket is high.

Hereinafter, a description is provided for the detailed configuration for suppressing electrolytic corrosion in this manner.

Figure 2A:
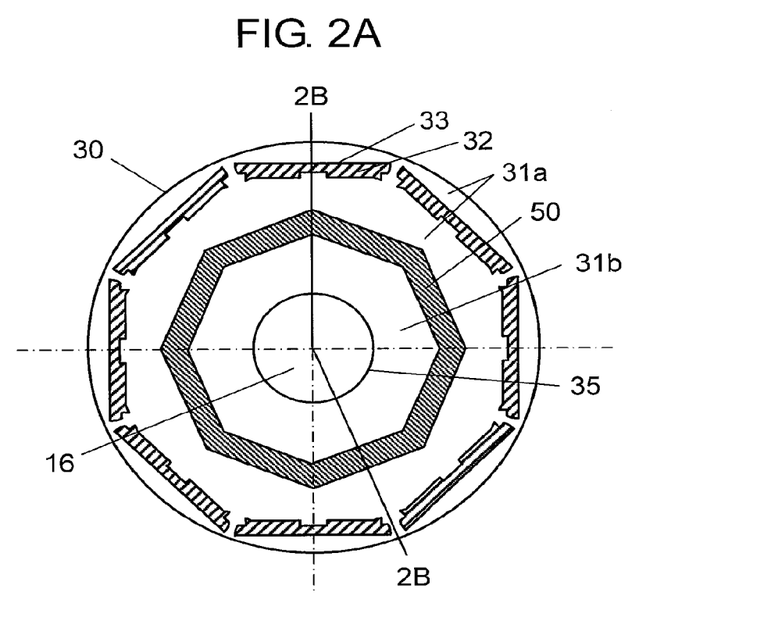
FIG. 2A is a diagram showing a configuration example of a rotating body of the electric motor.
Figure 2B:
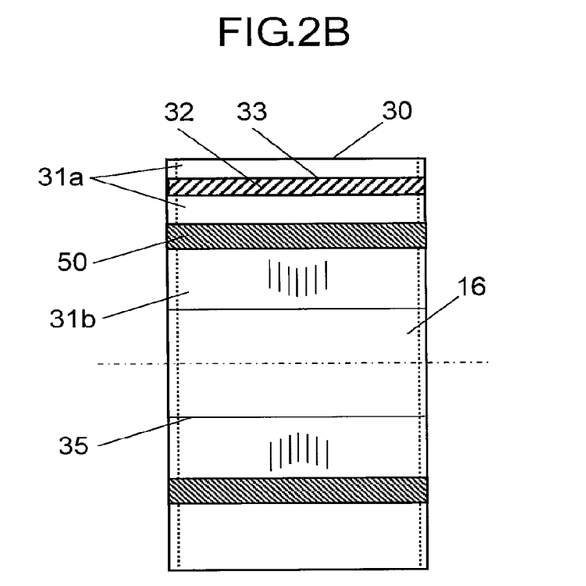
FIG. 2B is a diagram showing a section taken along line 2B-2B in FIG. 2A.

FIG. 2A and FIG. 2B are diagrams each showing a configuration example of rotating body 30 of electric motor 104 in this exemplary embodiment. FIG. 2A shows a configuration of rotating body 30 viewed from the top. FIG. 2B shows a section taken along line 2B-2B in FIG. 2A.

As shown in FIG. 2A and FIG. 2B, rotating body 30 is configured so as to have dielectric layer 50 between rotating shaft 16 and the outer circumference of rotating body 30. Dielectric layer 50 has a polygonal shape with rotating shaft 16 at the center, and is disposed in rotating body 30 such that this polygonal shape extends in the axial direction. Rotating body 30 has a plurality of insertion holes 33 penetrating through outer iron core 31a in the axial direction, and magnet 32 is inserted in each of insertion holes 33. Further, toward the inner circumferential side, the rotating body has dielectric layer 50 and inner iron core 31b forming rotor iron core 31 that are arranged in this order. This is a structure of the interior permanent magnet (IPM) type. Dielectric layer 50 is a layer formed of an insulating resin. FIG. 2A and FIG. 2B show an example of the following case. Outer iron core 31a has eight insertion holes 33 with corresponding eight magnets 32 inserted therein, and thus is magnetized with eight poles. With respect to such outer iron core 31a, octagonal dielectric layer 50 is formed such that each vertex of the polygon of dielectric layer 50 is disposed with the rotating shaft at the center, and is placed correspondingly to the center between the poles magnetized in magnet 32. Thus, rotating body 30 is integrally formed of magnet 32, outer iron core 31a, the insulating resin forming dielectric layer 50, and inner iron core 31b. In fastening part 35 on the inner circumference of inner iron core 31b, rotating body 30 is fastened to rotating shaft 16. Thus, rotor 14 journaled by bearings 15 is formed.

Figure 3:
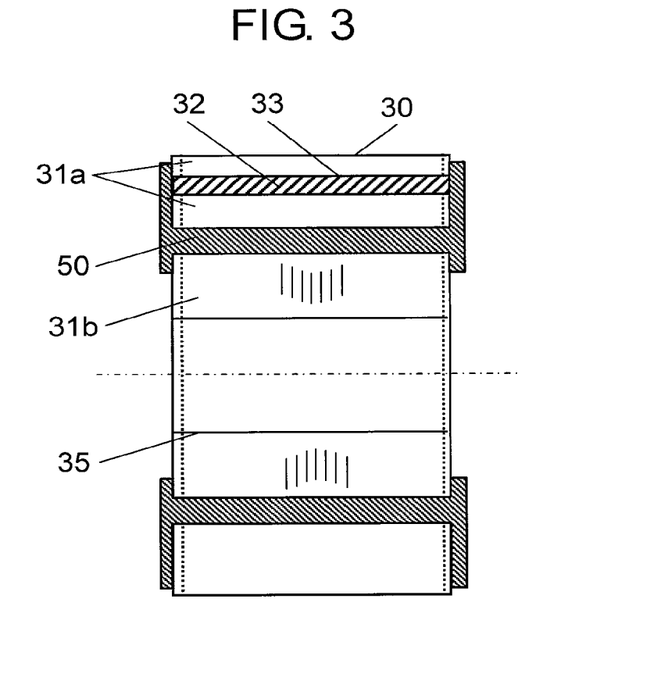
FIG. 3 is a diagram showing another configuration example of the rotating body of the electric motor.

FIG. 3 is a diagram showing a section of another configuration example of rotating body 30. In the configuration shown in FIG. 3, similarly to FIG. 2A and FIG. 2B, dielectric layer 50 is disposed in rotating body 30, and further covers both faces of rotating body 30 in the axial direction. That is, as shown in FIG. 3, dielectric layer 50 is integrally formed on the top and bottom end faces in the axial direction of magnet 32 so as to cover at least magnet 32 on both faces of rotating body 30 in the axial direction. Thereby, misalignment of magnet 32 can be prevented.

In rotating body 30, dielectric layer 50 is a layer formed of an insulting resin, i.e. an insulating material, and serially separates outer iron core 31a from inner iron core 31b so as to insulate them. In this exemplary embodiment, dielectric layer 50 thus formed increases the impedance of the rotor side such that the impedance of the rotor side is approximated to the impedance of the stator side. FIG. 2B and FIG. 3 show an example where dielectric layer 50 penetrates through rotating body 30 from one face to the other face in the axial direction. However, a configuration that partially has cavities may be used. In short, any configuration can be used as long as outer iron core 31a is insulated and separated from inner iron core 31b. Here, the impedance of the stator side is the impedance from stator iron core 11 to the outer ring of each bearing 15. The impedance of the rotor side is the impedance from stator iron core 11 via rotor 14 to the inner ring of each bearing 15.

In this manner, dielectric layer 50 is formed in the intermediate part of rotating body 30. This provides a configuration where the capacitance caused by dielectric layer 50 is series-connected as an equivalent circuit on the rotor side, and can increase the impedance of rotor 14. In the path where high-frequency signals generated in stator iron core 11 flow into rotating shaft 16 via rotating body 30 as high-frequency current, the increased impedance of rotor 14 increases a voltage drop in high-frequency waves. Such high-frequency signals are signals mainly generated in stator iron core 11 by switching based on the PWM system.

Thus, the above configuration can lower the electric potential generated in rotating shaft 16 by the high-frequency current, i.e. the electric potential of the inner-ring side of each bearing 15. The electric potential of the inner-ring side of each bearing 15 is lowered and approximated to the electric potential of the outer-ring side of corresponding bearing 15. Thereby, the electric potential difference between the inner ring and the outer ring of each bearing, i.e. the shaft voltage, is suppressed low. This keeps a balanced state between the inner ring and the outer ring of each bearing such that the electric potential is always low and the electric potential difference is small. In this exemplary embodiment, the shaft voltage is suppressed low in this manner, and thereby electrolytic corrosion caused by the shaft voltage in each bearing is prevented. Further, misalignment of outer iron core 31a, inner ion core 31b, and dielectric layer 50 caused by rotation is prevented, and the flow of magnetic flux generated from magnet 32 is not interrupted. Thus, the efficiency of the motor is not lowered. Particularly in this exemplary embodiment, the shaft voltage is suppressed low in the state where the respective electric potentials in the inner ring and the outer ring of each bearing are low. With this configuration, the shaft voltage is easily balanced so as to have a small electric potential difference in comparison with the technique for balancing the shaft voltage in the state where the respective electric potentials in the inner ring and the outer ring of each bearing are high. Even if the shaft voltage is unbalanced, the low voltage has only little effect on electrolytic corrosion.

The materials of dielectric layer 50 include thermosetting resins, e.g. unsaturated polyester resin and epoxy resin, thermoplastic resins, e.g. polybutylene terephthalate and polyamide, and elastic bodies, e.g. elastomer and vulcanized rubber. Not only such materials of dielectric layer 50 but also its shape and thickness can be changed so as to adjust the impedance to any value. Thus, the impedance of the rotor side can be set optimally.

Further, this exemplary embodiment has a configuration as described below for suppressing electrolytic corrosion.

Stator iron core 11, which is the main source of generating high-frequency signals that cause the shaft voltage, is electrically connected with the ground part via connection pin 24. With this configuration, high-frequency signals generated in stator iron core 11 also flow into the ground. This can attenuate the high-frequency signals generated in stator iron core 11 and suppress the electric potential caused between the inner ring and the outer ring of each bearing.

Further, in this exemplary embodiment, two brackets, i.e. bracket 17 and bracket 19, are electrically connected with each other by conductive pin 22. This configuration makes both brackets at an equal electric potential, and suppresses the flow of high-frequency current via the rotating shaft. Further, both brackets at the equal electric potential can make the electric potential difference between the inner ring and the outer ring of bearing 15a approximated or equal to the electric potential difference between the inner ring and the outer ring of bearing 15b. This can suppress a failure such that electrolytic corrosion occurs intensively in one bracket only.

As described above, in electric motor 104, dielectric layer 50 is formed in rotating body 30, and stator iron core 11 is electrically connected with the ground part. Further, bracket 17 and bracket 19 are electrically connected with each other. This configuration can suppress the shaft voltage in each of bearing 15a and bearing 15b low, and thereby suppress occurrence of electrolytic corrosion.

The above description shows an example where stator iron core 11 is electrically connected with the ground part. Bracket 17 and bracket 19 electrically connected with each other may be further electrically connected with the ground part.

Second Exemplary Embodiment

Figure 4:
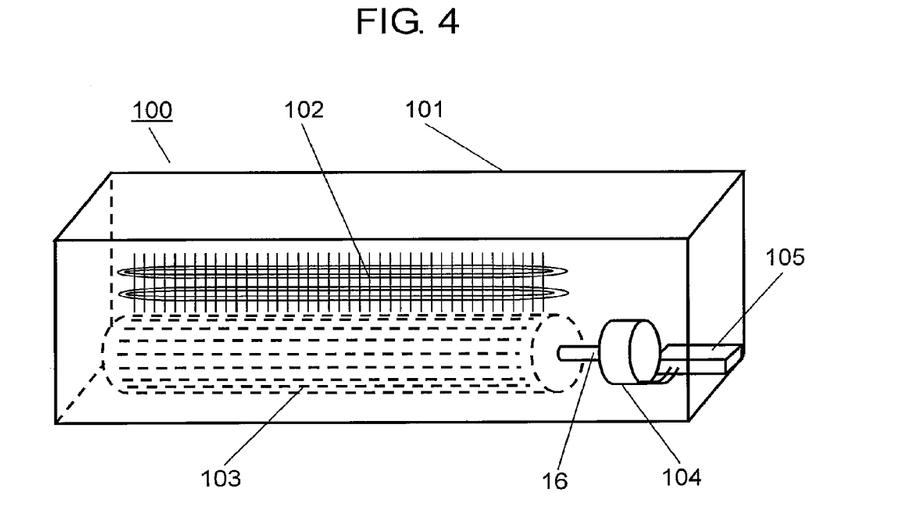
FIG. 4 is a configuration diagram of an air conditioner as an example of an electric device in accordance with a second exemplary embodiment of the present invention.

FIG. 4 is a configuration diagram of an air conditioner in accordance with the second exemplary embodiment of the present invention. In this exemplary embodiment, an air conditioner installed indoors as an indoor unit is described as an example of an electric device of the present invention. As shown in FIG. 4, air conditioner 100 includes heat exchanger 102, fan 103, and electric motor 104 of the first exemplary embodiment in housing 101.

Heat exchanger 102 is configured so as to include a conductive metal member, and performs heat exchange of the air having taken in from a suction part for cooling and heating. Fan 103 is a cross flow fan, and blows the air conditioned by heat exchanger 102. Electric motor 104 is connected to fan 103 via rotating shaft 16 of electric motor 104, and rotary-drives fan 103. With such a configuration of air conditioner 100, the air conditioned by heat exchanger 102 is blown by rotation of fan 103 into the room, for example.

As described above, air conditioner 100 includes electric motor 104 of the first exemplary embodiment. Particularly when electric motor 104 is used in air conditioner 100 as an indoor unit, high-frequency signals generated in stator iron core 11 are likely to be transferred from rotating body 30 via rotating shaft 16 to fan 103. The signals are further transferred from fan 103 to heat exchanger 102 in some cases. In the case of air conditioner 100 as such an indoor unit, fan 103 and heat exchanger 102 have large areas and volumes, and thus high-frequency signals transferred to these elements are likely to radiate as unnecessary signals and the radiated signals can go into bearings 15 and affect the shaft voltage. To address such a problem, dielectric layer 50 works as an impedance component series-connected between stator iron core 11 and fan 103, and thus can attenuate high-frequency signals transferred to fan 103. That is, this configuration can also suppress the shaft voltage caused by unnecessary radiation from fan 103 and heat exchanger 102.

When electric motor 104 of the first exemplary embodiment is thus used in air conditioner 100 as an indoor unit, occurrence of electrolytic corrosion can be advantageously suppressed.

Third Exemplary Embodiment

Next, a detailed description is provided for a configuration of an outdoor unit of an air conditioner in accordance with the third exemplary embodiment as another example of an electric device of the present invention.

Figure 5:
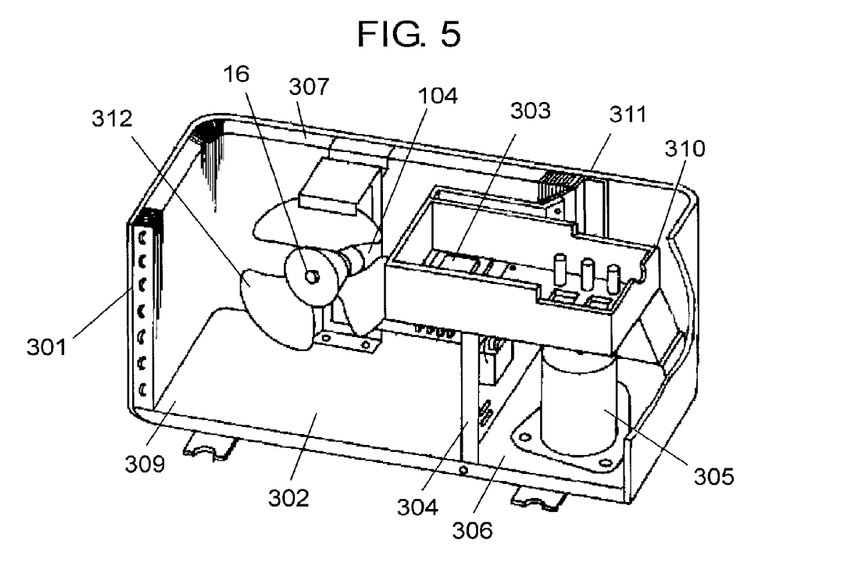
FIG. 5 is a configuration diagram of an air conditioner as an example of an electric device in accordance with a third exemplary embodiment of the present invention.

With reference to FIG. 5, air conditioner outdoor unit 301 includes electric motor 104 of the first exemplary embodiment inside housing 311. Electric motor 104 has fan 312 attached to rotating shaft 16, and functions as a blower electric motor.

Air conditioner outdoor unit 301 is partitioned into compressor chamber 306 and heat-exchanger chamber 309 by partition plate 304 standing on base plate 302 of housing 311. Compressor 305 is disposed in compressor chamber 306. Heat exchanger 307 and the blower electric motor are disposed in heat-exchanger chamber 309. Electrical component box 310 is disposed on partition plate 304.

In the blower electric motor, fan 312 is rotated by rotation of electric motor 104 that is driven by motor drive unit 303 housed in electrical component box 310. Then, the blower electric motor blows air through heat exchanger 307 into heat-exchanger chamber 309.

The electric device of the present invention includes an electric motor, and a housing including the electric motor. As the electric motor, the electric device uses the electric motor of the present invention configured as above.

As described above, the electric motor of the present invention includes the following elements:
- a stator having a winding wound on a stator iron core;
- a rotor facing the stator with a rotating shaft at the center;
- a rotating body including a dielectric layer;
- a bearing for journaling the rotating shaft; and
- two conductive brackets for fixing the bearing.

The dielectric layer is formed between the rotating shaft and the outer circumference of the rotating body. The dielectric layer has a polygonal shape with the rotating shaft at the center. The number of corners of the polygon is equal to the number of magnetized poles of the magnet held in the rotating body. Each vertex of the polygon of the dielectric layer is disposed correspondingly to the center between poles magnetized in the magnet held in the rotating body, with the rotating shaft at the center.

The electric device of the present invention is configured so as to include the electric motor of the present invention.

This configuration can prevent misalignment of the outer iron core, the dielectric layer, and the inner iron core of the rotor caused by rotation, keep the balance in impedance between the stator side and the rotor side, and reduce a shaft voltage without reducing the efficiency of the motor. Thus, the electric potential difference between the outer ring and the inner ring of each bearing, i.e. the shaft voltage, can be suppressed extremely low, and thereby occurrence of electrolytic corrosion can be suppressed. Therefore, the present invention can provide an electric motor where electrolytic corrosion in bearings is suppressed, and an electric device including the electric motor.

The above description shows the indoor unit and the outdoor unit of an air conditioner, as examples of the electric devices of the present invention. The present invention can be used in other electric devices, such as a hot water supplier, an air clearer, and a washing machine.

Industrial Applicability

In an electric motor and an electric device of the present invention, the shaft voltage in the motor can be reduced and thus occurrence of electrolytic corrosion in the bearing is optimally suppressed. Thus, the present invention is effective for the indoor unit of an air conditioner, for example.

The invention claimed is:

1. An electric motor comprising:
    a stator that has a stator winding wound on a stator iron core;
    a rotor including:
        a rotating body facing the stator and holding magnets; and
        a rotating shaft having the rotating body fastened thereto so as to penetrate through a center of the rotating body;
    a bearing for journaling the rotating shaft; and
    two brackets for fixing the bearing,
    wherein a dielectric layer is formed between the rotating shaft and an outer circumference of the rotating body, the dielectric layer has a polygonal shape with the rotating shaft at a center thereof, and a number of corners of the polygon of the dielectric layer is equal to a number of magnetized poles of the magnet held in the rotating body.

2. The electric motor of claim 1, wherein each vertex of the polygon of the dielectric layer is placed correspondingly to a center between poles magnetized in the magnet held in the rotating body with the rotating shaft at the center.

3. The electric motor of claim 1, wherein each vertex of the polygon of the dielectric layer is formed into an R shape.

4. The electric motor of claim 1, wherein the rotating body has a plurality of insertion holes on an outer peripheral side of the dielectric layer, and the magnet is inserted in each of the insertion holes.

5. The electric motor of claim 1, wherein the dielectric layer covers at least the magnet on both sides of the rotating body in an axial direction.

6. The electric motor of claim 1, wherein the two brackets have conductivity and are electrically connected with each other.

7. The electric motor of claim 1, wherein the stator iron core is grounded.

8. The electric motor of claim 1, wherein the two brackets electrically connected with each other and the stator iron core are grounded.

9. The electric motor of claim 1, wherein the stator winding wound on the stator iron core is driven by an inverter of a pulse width modulation system.

10. An electric device comprising the electric motor of claim 1.

11. An electric device comprising the electric motor of any one of claims 2.

12. An electric device comprising the electric motor of any one of claims 3.

13. An electric device comprising the electric motor of any one of claims 4.

14. An electric device comprising the electric motor of any one of claims 5.

15. An electric device comprising the electric motor of any one of claims 6.

16. An electric device comprising the electric motor of any one of claims 7.

17. An electric device comprising the electric motor of any one of claims 8.

18. An electric device comprising the electric motor of any one of claims 9.

* * * * *